United States Patent
Inomata

(10) Patent No.: US 10,894,394 B2
(45) Date of Patent: Jan. 19, 2021

(54) DECORATIVE SHEET

(71) Applicant: RIKEN TECHNOS CORPORATION, Tokyo (JP)

(72) Inventor: Hitomi Inomata, Tokyo (JP)

(73) Assignee: RIKEN TECHNOS CORPORATION

( * ) Notice: Subject to any disclaimer, the term of this patent is extended or adjusted under 35 U.S.C. 154(b) by 139 days.

(21) Appl. No.: 16/302,463

(22) PCT Filed: Apr. 24, 2017

(86) PCT No.: PCT/JP2017/016172
§ 371 (c)(1),
(2) Date: Nov. 16, 2018

(87) PCT Pub. No.: WO2017/199694
PCT Pub. Date: Nov. 23, 2017

(65) Prior Publication Data
US 2019/0291392 A1    Sep. 26, 2019

(30) Foreign Application Priority Data

May 16, 2016    (JP) .................................. 2016-097551

(51) Int. Cl.
| | |
|---|---|
| *B32B 27/08* | (2006.01) |
| *B32B 7/12* | (2006.01) |
| *B32B 17/06* | (2006.01) |
| *B32B 27/20* | (2006.01) |
| *B32B 27/36* | (2006.01) |
| *B32B 27/00* | (2006.01) |

(52) U.S. Cl.
CPC .............. *B32B 27/08* (2013.01); *B32B 7/12* (2013.01); *B32B 17/064* (2013.01); *B32B 27/00* (2013.01);
(Continued)

(58) Field of Classification Search
CPC ......... B32B 27/08; B32B 7/12; B32B 17/064; B32B 27/20; B32B 27/36; B32B 27/00;
(Continued)

(56) References Cited

FOREIGN PATENT DOCUMENTS

| | | |
|---|---|---|
| JP | 2001001444 A | 1/2001 |
| JP | 2008030266 A | 2/2008 |

(Continued)

OTHER PUBLICATIONS

English machine translation of JP 2001-1444, Jan. 9, 2001.*
(Continued)

*Primary Examiner* — Michael C Miggins
(74) *Attorney, Agent, or Firm* — Bracewell LLP; Brad Y. Chin

(57) ABSTRACT

Embodiments relate to a decorative sheet having a hairline design and including successively, from a front surface side thereof, (A) a layer of a transparent resin film and (B) a layer of an ink paint film containing high brightness pigment. A plurality of linear hairline grooves is provided on a surface of the transparent resin film on a side thereof facing (B) the layer of the ink paint film containing the high brightness pigment. The decorative sheet has a surface resistivity of $1 \times 10^5 \Omega$ or more on a rear surface side thereof. When the decorative sheet is placed on a dirt comparison chart created by the NPB in an environment of an illuminance of 600 lux, and is illuminated from below the chart at an illuminance of 17000 lux, a figure having a size of 5 mm² on the chart can be visually discriminated. When the decorative sheet is placed on a gray scale for soiling stipulated in JIS L0805: 2005 in an environment of an illuminance of 500 lux, the color difference between color chips numbers 4 and 5 cannot be visually discriminated.

6 Claims, 2 Drawing Sheets

(52) U.S. Cl.
CPC .............. *B32B 27/20* (2013.01); *B32B 27/36* (2013.01); *B32B 2307/4023* (2013.01); *B32B 2451/00* (2013.01); *B32B 2457/208* (2013.01)

(58) Field of Classification Search
CPC ........ B32B 2307/4023; B32B 2451/00; B32B 2457/208
See application file for complete search history.

(56) References Cited

FOREIGN PATENT DOCUMENTS

| | | |
|---|---|---|
| JP | 2010060190 A | 3/2010 |
| JP | 2010234562 A | 10/2010 |
| JP | 2012250480 A | 12/2012 |
| JP | 2014062709 A | 4/2014 |
| JP | 5659281 B1 | 1/2015 |
| JP | 2015044890 A | 3/2015 |
| JP | 2015048985 A | 3/2015 |

OTHER PUBLICATIONS

PCT/JP2017/016172 Notification Concerning Transmittal of International Preliminary Report on Patentability; 12 pgs.
EP17799124.7 Extended European Search Report dated Dec. 13, 2019, 9 pgs.
PCT/JP2017/016172 International Search Report dated Jul. 25, 2017; 2 pgs.
CN201780030018.8 First Office Action dated Jul. 6, 2020, 10 pgs.
TW106114974 First Office Action dated Sep. 24, 2020, 9 pgs.

* cited by examiner

DECORATIVE SHEET

CROSS REFERENCE TO RELATED APPLICATIONS

This application claims the benefit of and priority to PCT/JP2017/016172, filed on Apr. 24, 2017, entitled (translation), "DECORATIVE SHEET," which claims the benefit of and priority to Japanese Patent Application No. 2016-097551, filed on May 16, 2016, which are hereby incorporated by reference in their entirety into this application.

BACKGROUND

Embodiments relate to a decorative sheet. More specifically, embodiments relate to a decorative sheet having a hairline design.

DESCRIPTION OF THE RELATED ART

The hairline design of the decorative sheet simulates a design formed by engraving many fine lines on a surface of a metal article. Many proposals have been made in order to make the hairline design of the decorative sheet more highly designed (See, for example, JP-A-2008-030266 and JP-A-2010-234562).

In recent years, glass has drawn attention as a member constituting a front panel of a door body for opening/closing a front part of a main body of an article such as a refrigerator, a washing machine, a cupboard, or a costume shelf, or a flat panel of a lid body for opening/closing a flat part of the main body due to a sense of design with transparency of glass. However, glass has a disadvantage that glass has low impact resistance to be easily broken. Therefore, it has been proposed to bond a resin sheet (decorative sheet) having a design to a rear surface side of a glass front panel also for imparting a scattering prevention function (See, for example, JP-A-2014-062709 and JP-A-2010-060190).

In recent years, a touch panel has become widespread. A refrigerator that can be operated by visually checking an icon displayed on the touch panel through a decorative sheet attached to a rear surface side of a glass front panel has been proposed (See, for example, JP-B-5659281). In an article such as a refrigerator, a hairline design is one of designs preferred by consumers. It is required to impart a hairline design also to a decorative sheet used for such an article. However, when it is tried to impart a design having a texture closer to a design formed on a surface of a metal article to a decorative sheet by a method such as metal vapor deposition, conductivity of the decorative sheet is increased, and a touch panel cannot be operated. Meanwhile, when the touch panel can be operated, a design property of the decorative sheet is made low disadvantageously.

SUMMARY

According to various embodiments, there is provided a decorative sheet having a hairline design and making operation possible by visually checking an icon displayed on a touch panel through the decorative sheet.

According to various embodiments, the object of the subject application can be achieved by a specific decorative sheet.

According to at least one embodiment, there is provided a decorative sheet including sequentially, from a front surface side thereof, (A) a layer of a transparent resin film and (B) a layer of an ink paint film containing a high brightness pigment, where a plurality of linear hairline grooves are formed on a surface of the transparent resin film facing (B) the layer of an ink paint film containing a high brightness pigment, the decorative sheet has a surface resistivity of $1 \times 10^5 \Omega$ or more on a rear surface side thereof, when the decorative sheet is placed on the dirt comparison chart available from National Printing Bureau in an environment of an illuminance of 600 lux, and is illuminated from below the chart at an illuminance of 17000 lux, a figure having a size of 5 mm$^2$ on the chart can be visually discriminated, and when the decorative sheet is placed on a gray scale for assessing staining defined in JIS L 0805:2005 in an environment of an illuminance of 500 lux, a color difference of a color chip number 4-5 cannot be visually discriminated.

According to at least one embodiment, the decorative sheet may further include sequentially, from a front surface side thereof, (A) the layer of the transparent resin film, (B) the layer of the ink paint film containing a high brightness pigment, and (C) a protective layer, in which the protective layer (C) may have total light transmittance of 5 to 30%.

According to at least one embodiment, the decorative sheet may be a decorative sheet in which each of the hairline grooves has a depth of 0.05 to 15 µm, a distance between the hairline grooves adjacent to each other is 1 to 500 µm, and on a surface of the transparent resin film where the hairline grooves are formed, any square having a length of 1 mm in a direction perpendicular to the hairline grooves and a length of 1 mm in a parallel direction thereto has one or more portions where a distance between the hairline grooves adjacent to each other is 50 µm or more.

According to at least one embodiment, the decorative sheet may be a decorative sheet in which the high brightness pigment is formed of aluminum flakes, and (B) the layer of an ink paint film containing a high brightness pigment has a thickness of 0.1 to 20 µm in a portion other than a portion in contact with the hairline grooves.

According to another embodiment, there is provided an article having the decorative sheet laminated on a surface of a display with a touch panel function such that a rear surface side of the decorative sheet serves as the display side.

According to at least one embodiment, the article may be an article further having a glass plate or a transparent resin plate laminated on a surface thereof on a side of (A) the layer of a transparent resin film.

DETAILED DESCRIPTION

Figure 1:
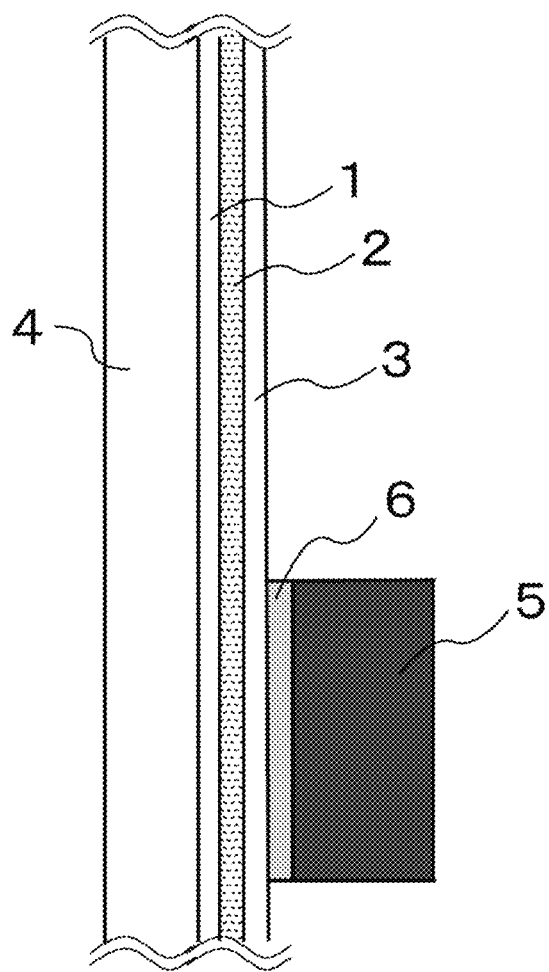
FIG. 1 is a conceptual view of a part of a cross section illustrating an example of a door body using a decorative sheet according to an embodiment.

Here, the term "film" is used as a term also including a sheet. The term "resin" is used as a term also including a resin mixture containing two or more resins and a resin composition containing a component other than a resin. The term "front panel" is used in such a manner that the front panel is mutually exchangeable or replaceable with any one of a flat panel, a rear panel, a side panel, and a bottom panel.

Here, sequentially laminating one layer and another layer includes laminating these layers directly and laminating these layers with one or more other layers such as an anchor coat interposed therebetween. Here, the term "or more"

related to a numerical range is used to mean a certain numerical value or more than the certain numerical value. For example, 20% or more means 20% or more than 20%. The term "or less" related to a numerical range is used to mean a certain numerical value or less than the certain numerical value. For example, 20% or less means 20% or less than 20%. Furthermore, the term "to" related to a numerical range is used to mean a certain numerical value, more than the certain numerical value and less than other certain numerical value, or the other certain numerical value. Here, the other certain numerical value is a numerical value larger than the certain numerical value. For example, 10 to 90% means 10%, more than 10% and less than 90%, or 90%.

1. Decorative Sheet

According to at least one embodiment, the decorative sheet includes sequentially, from a front surface side thereof, (A) a layer of a transparent resin film and (B) a layer of an ink paint film containing a high brightness pigment. A plurality of linear hairline grooves are formed on a surface of (A) the transparent resin film facing (B) the ink paint film containing a high brightness pigment. According to at least one embodiment, the hairline grooves are a plurality of substantially parallel linear hairline grooves arranged at random intervals.

Here, the "front surface side" of the decorative sheet means a side closer to an outer surface (front surface) directly observed by a user of an article decorated with the decorative sheet when the article is used for its original use. The "rear surface side" of the decorative sheet means a side closer to an outer surface (rear surface) opposite to the outer surface directly observed by a user of an article decorated with the decorative sheet when the article is used for its original use. For example, in a case where the decorative sheet is formed of (A) the layer of a transparent resin film and (B) the layer of an ink paint film containing a high brightness pigment, the side of (A) the layer of the transparent resin film is the front surface side, and the side of (B) the layer of an ink paint film containing a high brightness pigment is the rear surface side.

Here, "substantially parallel" means that adjacent hairline grooves do not usually intersect with each other. Since "not usually" is meant, even if there are some portions where adjacent hairline grooves intersect with each other, this is not excluded and is included in a range of "substantially parallel".

(A) Layer of Transparent Resin Film (A) The layer of a transparent resin film is formed of a transparent resin film. The transparent resin film is highly transparent from a viewpoint of imparting a hairline design of a texture closer to a hairline design formed on a surface of a metal article.

According to at least one embodiment, the transparent resin film has a total light transmittance (measured according to JIS K7361-1:1997 using a turbidimeter "NDH2000" (trade name) available from Nippon Denshoku Industries Co., Ltd.) preferably of 80% or more, more preferably of 85% or more, still more preferably of 90% or more. A higher total light transmittance is more preferable.

According to at least one embodiment, the transparent resin film has a haze (measured according to JIS K7136:2000 using a turbidimeter "NDH2000" (trade name) available from Nippon Denshoku Industries Co., Ltd.) preferably of 4% or less, more preferably of 3% or less, still more preferably of 2% or less, most preferably of 1.5% or less. A lower haze is more preferable.

According to at least one embodiment, the transparent resin film is not limited as long as having high transparency, and any transparent resin film can be used. Examples of the transparent resin film include a transparent resin film of a polyester-based resin such as an aromatic polyester or an aliphatic polyester; an acrylic resin; a polycarbonate-based resin; a polyolefin-based resin such as polyethylene, polypropylene, or polymethyl pentene; a cellulose-based resin such as cellophane, triacetylcellulose, diacetylcellulose, or acetylcellulose butyrate; a styrene-based resin such as polystyrene, an acrylonitrile-butadiene-styrene copolymer resin (ABS resin), a styrene-ethylene-butadiene-styrene copolymer, a styrene-ethylene-propylene-styrene copolymer, or a styrene-ethylene-ethylene-propylene-styrene copolymer; a polyvinyl chloride-based resin; a polyvinylidene chloride-based resin; a fluorine-containing resin such as polyvinylidene fluoride; polyvinyl alcohol, ethylene vinyl alcohol, polyether ether ketone, nylon, polyamide, polyimide, polyurethane, polyetherimide, polysulfone, or polyethersulfone. These films include an unstretched film, a uniaxially stretched film, and a biaxially stretched film. These films also include a laminated film obtained by laminating two or more layers of one or more of these films. These films may be colored to a desired color as long as maintaining transparency.

In a case where the transparent resin film is a laminated film, a lamination method is not limited, and lamination can be performed by any method. Examples of the method include a method including obtaining each of resin films by any method and then subjecting the resin films to dry lamination or heat lamination; a method including melting each constituent material with an extruder to obtain a laminated film by T-die co-extrusion using a feed block process, a multi-manifold process, or a stack plate process; an extrusion lamination method including obtaining at least one resin film by any method and then melting and extruding another resin film onto the resin film; a method including forming a resin film by melt extrusion onto any film substrate or by applying and drying a paint including a constituent material and a solvent thereonto, peeling the formed resin film off from the film substrate, and transferring the resin film onto another resin film; and a method including two or more of these methods in any combination.

In a case where the transparent resin film is a laminated film, embossing may be applied between any layers, as desired, in order to enhance a sense of design.

In a case where the transparent resin film is a laminated film, a printed layer may be disposed between any layers, as desired, in order to enhance a sense of design. The printed layer can be formed by printing any pattern using any ink and any printing machine. At this time, printing is preferably performed partially, for example, avoiding a touch panel portion or using a transparent ink from a viewpoint of making it possible to visually check an icon displayed on the touch panel and from a viewpoint of further enhancing a sense of depth. The number of the printed layer is not limited to one, but may be two or more.

As the transparent resin film, a polyester-based resin film, an aromatic polycarbonate-based resin film, and an acrylic resin film are preferable from viewpoints of a design property and transparency.

According to at least one embodiment, the polyester-based resin film is formed of a resin mainly including a polyester-based resin such as polyethylene terephthalate (usually 50% by mass or more, preferably 80% by mass or more, more preferably 90% by mass or more). These films include an unstretched film, a uniaxially stretched film, and a biaxially stretched film. In addition, these films include a laminated film obtained by laminating one or more kinds of these films.

More preferably, the polyester-based resin film may be a biaxially stretched polyethylene terephthalate-based resin film. The biaxially stretched polyethylene terephthalate-based resin film is widely and commercially available, and any biaxially stretched polyethylene terephthalate-based resin film can be used.

According to at least one embodiment, the polyester-based resin film may be more preferably formed of a resin mainly including an amorphous or low crystalline aromatic polyester-based resin (usually 50% by mass or more, preferably 80% by mass or more, more preferably 90% by mass or more).

Here, in a second melting curve (melting curve measured in a last temperature-rising process) measured with a temperature program in which the temperature of a sample is held at 320° C. for five minutes, then lowered to −50° C. at a temperature falling rate of 20° C./min., held at −50° C. for five minutes, and then raised to 320° C. at a temperature rising rate of 20° C./min using a Diamond DSC type differential scanning calorimeter available from Perkin Elmer Japan Co., Ltd, a polyester having a heat of fusion of 10 J/g or less is defined as an amorphous resin, and a polyester having a heat of fusion of more than 10 J/g and 60 J/g or less is defined as a low crystalline resin.

Examples of the amorphous or low crystalline aromatic polyester-based resin include a polyester-based copolymer formed of an aromatic polycarboxylic acid component such as terephthalic acid, isophthalic acid, orthophthalic acid, or naphthalene dicarboxylic acid and a polyhydric alcohol component such as ethylene glycol, diethylene glycol, neopentyl glycol, 1,2-butanediol, 1,3-butanediol, 1,4-butanediol, 1,5-pentanediol, 3-methyl-1,5-pentanediol, 2-methyl-1,3-propanediol, or 1,4-cyclohexanedimethanol.

Examples of the amorphous or low crystalline aromatic polyester-based resin include a glycol-modified polyethylene terephthalate (PETG) containing 45 to 50 mol % of terephthalic acid, 30 to 40 mol % of ethylene glycol, and 10 to 20 mol % of 1,4-cyclohexanedimethanol; a glycol-modified polycyclohexylenedimethylene terephthalate (PCTG) containing 45 to 50 mol % of terephthalic acid, 16 to 21 mol % of ethylene glycol, and 29 to 34 mol % of 1,4-cyclohexanedimethanol; an acid-modified polycyclohexylenedimethylene terephthalate (PCTA) containing 25 to 49.5 mol % of terephthalic acid, 0.5 to 25 mol % of isophthalic acid, and 45 to 50 mol % of 1,4-cyclohexanedimethanol; an acid-modified and glycol-modified polyethylene terephthalate containing 30 to 45 mol % of terephthalic acid, 5 to 20 mol % of isophthalic acid, 35 to 48 mol % of ethylene glycol, 2 to 15 mol % of neopentyl glycol, less than 1 mol % of diethylene glycol, and less than 1 mol % of bisphenol A; and an acid-modified and glycol-modified polyethylene terephthalate containing 45 to 50 mol % of terephthalic acid, 5 to 0 mol % of isophthalic acid, 25 to 45 mol % of 1,4-cyclohexanedimethanol, and 25 to 5 mol % of 2,2,4,4-tetramethyl-1,3-cyclobutanediol, relative to 100 mol % of the total amount of monomers.

These compounds can be used singly or in a mixture of two or more kinds thereof as the amorphous or low crystalline aromatic polyester-based resin.

According to at least one embodiment, the polyester-based resin may include another component as desired within a range not contradictory to an object of the various embodiments. Examples of the optional component which can be contained in the polyester-based resin include a thermoplastic resin other than the polyester-based resin; a pigment, an inorganic filler, an organic filler, and a resin filler; and an additive such as a lubricant, an antioxidant, a weather resistance stabilizer, a heat stabilizer, a release agent, an antistatic agent, or a surfactant. The blending amount of these optional components is usually 25 parts by mass or less and preferably about 0.01 to 10 parts by mass relative to 100 parts by mass of the polyester-based resin.

Preferable examples of an optional component which can be included in the polyester-based resin include a core-shell rubber. By using the core-shell rubber, impact resistance of the polyester-based resin film can be improved.

Examples of the core-shell rubber include a single core-shell rubber of a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, or a methacrylate-acrylonitrile/acrylate rubber graft copolymer, and a mixture of two or more kinds thereof. These compounds can be used singly or in a mixture of two or more kinds thereof as the core-shell rubber.

When the amount of the polyester-based resin is 100 parts by mass, the blending amount of the core-shell rubber is preferably 0.5 parts by mass or more in order to improve impact resistance. Meanwhile, the blending amount of the core-shell rubber is preferably 5 parts by mass or less, and more preferably 3 parts by mass or less in order to retain transparency.

According to at least one embodiment, the aromatic polycarbonate-based resin film is formed of a resin mainly including an aromatic polycarbonate-based resin (usually 50% by mass or more, preferably 70% by mass or more, more preferably 90% by mass or more).

As the aromatic polycarbonate-based resin, for example, it is possible to use one kind or a mixture of two or more kinds of aromatic polycarbonate-based resins such as a polymer obtained by an interfacial polymerization method for an aromatic dihydroxy compound such as bisphenol A, dimethyl bisphenol A, or 1,1-bis(4-hydroxyphenyl)-3,3,5-trimethylcyclohexane and phosgene; and a polymer obtained by a transesterification reaction between an aromatic dihydroxy compound such as bisphenol A, dimethyl bisphenol A, or 1,1-bis(4-hydroxyphenyl)-3,3,5-trimethylcyclohexane and a carbonate diester such as diphenyl carbonate.

Preferable examples of an optional component(s) which can be contained in the aromatic polycarbonate-based resin include a core-shell rubber. By using the core-shell rubber in an amount of 0 to 30 parts by mass (100 to 70 parts by mass of the aromatic polycarbonate-based resin), preferably in an amount of 0 to 10 parts by mass (100 to 90 parts by mass of the aromatic polycarbonate-based resin) relative to 100 parts by mass of the total amount of the aromatic polycarbonate-based resin and the core-shell rubber, cutting processability and impact resistance of the aromatic polycarbonate-based resin film can be enhanced.

Examples of the core-shell rubber include a core-shell rubber such as a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, or a methacrylate-acrylonitrile/acrylate rubber graft copolymer. These compounds can be used singly or in a mixture of two or more kinds thereof as the core-shell rubber.

According to at least one embodiment, the aromatic polycarbonate-based resin may further include, as desired, a thermoplastic resin other than an aromatic polycarbonate-based resin and a core-shell rubber; a pigment, an inorganic filler, an organic filler, and a resin filler; and an additive such as a lubricant, an antioxidant, a weather resistance stabilizer, a heat stabilizer, a release agent, an antistatic agent, or a surfactant within a range not contradictory to an object of the various embodiments. The blending amount of these optional components is usually about from 0.01 to 10 parts by mass relative to 100 parts by mass of the total amount of the aromatic polycarbonate-based resin and the core-shell rubber.

According to at least one embodiment, the acrylic resin film is formed of a resin mainly including an acrylic resin such as polymethyl methacrylate or polyethyl methacrylate (usually 50% by mass or more, preferably 60% by mass or more, more preferably 70% by mass or more).

Examples of the acrylic resin include a (meth)acrylate (co)polymer, a copolymer mainly including a structural unit derived from a (meth)acrylate (usually 50 mol % or more, preferably 65 mol % or more, more preferably 70 mol % or more), and a modified product thereof. It should be noted that the term (meth)acrylic means acrylic or methacrylic. In addition, the term (co)polymer means a polymer or a copolymer.

Examples of the (meth)acrylate (co)polymer include polymethyl (meth)acrylate, polyethyl (meth)acrylate, polypropyl (meth)acrylate, polybutyl (meth)acrylate, a methyl (meth)acrylate-butyl (meth)acrylate copolymer, and an ethyl (meth)acrylate-butyl (meth)acrylate copolymer.

Examples of the copolymer mainly including a structural unit derived from a (meth)acrylate include an ethylene-methyl (meth)acrylate copolymer, a styrene-methyl (meth)acrylate copolymer, a vinylcyclohexane-methyl (meth)acrylate copolymer, a maleic anhydride-methyl (meth)acrylate copolymer, and an N-substituted maleimide-methyl (meth)acrylate copolymer.

Examples of the modified product include a polymer into which a lactone ring structure is introduced by an intramolecular cyclization reaction; a polymer into which glutaric anhydride is introduced by an intramolecular cyclization reaction; and a polymer into which an imide structure is introduced by a reaction with an imidating agent (for example, methyl amine, cyclohexyl amine, or ammonia).

These compounds can be used singly or in a mixture of two or more kinds thereof as the acrylic resin.

Preferable examples of an optional component(s) which can be contained in the acrylic resin include a core-shell rubber. When the total amount of the acrylic resin and the core-shell rubber is 100 parts by mass, by using usually 0 to 50 parts by mass of the core-shell rubber (100 to 50 parts by mass of the acrylic resin), preferably 0 to 40 parts by mass of the core-shell rubber (100 to 60 parts by mass of the acrylic resin), more preferably 0 to 30 parts by mass of the core-shell rubber (100 to 70 parts by mass of the acrylic resin), cutting processability and impact resistance of the acrylic resin film can be enhanced.

Examples of the core-shell rubber include a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, and a methacrylate-acrylonitrile/acrylate rubber graft copolymer. These compounds can be used singly or in a mixture of two or more kinds thereof as the core-shell rubber.

Examples of the other optional component which can be included in the acrylic resin include a thermoplastic resin other than the acrylic resin and the core-shell rubber; a pigment, an inorganic filler, an organic filler, and a resin filler; and an additive such as a lubricant, an antioxidant, a weather resistance stabilizer, a heat stabilizer, a release agent, an antistatic agent, a nucleating agent, or a surfactant. Usually, the blending amount of these optional components is usually 25 parts by mass or less and preferably about 0.01 to 10 parts by mass relative to 100 parts by mass of the total of the acrylic resin and the core-shell rubber.

According to at least one embodiment, the thickness of the transparent resin film is not limited as long as being larger than the depth of each of the hairline grooves, and may be any thickness. The thickness may be usually 25 µm or more, preferably 35 µm or more, and more preferably 45 µm or more from a viewpoint of imparting a glass scattering prevention function. In addition, the thickness may be usually 1500 µm or less, preferably 800 µm or less, more preferably 400 µm or less, and still more preferably 200 µm or less from a viewpoint of meeting a demand for thickness reduction of an article. In another embodiment, the thickness of the transparent resin film may be 25 µm or more and 1500 µm or less, 25 µm or more and 800 µm or less, 25 µm or more and 400 µm or less, 25 µm or more and 200 µm or less, 35 µm or more and 1500 µm or less, 35 µm or more and 800 µm or less, 35 µm or more and 400 µm or less, 35 µm or more 200 µm or less, 45 µm or more and 1500 µm or less, 45 µm or more and 800 µm or less, 45 µm or more and 400 µm or less, or 45 µm or more and 200 µm or less.

A plurality of linear hairline grooves are formed on a surface (that is, on a rear surface side) of the transparent resin film facing (B) the layer of an ink paint film containing a high brightness pigment. A plurality of substantially parallel linear hairline grooves arranged at random intervals are preferably formed on the surface (that is, on a rear surface side) of the transparent resin film facing (B) the layer of an ink paint film containing a high brightness pigment. A method for forming the hairline grooves in the transparent resin film is not particularly limited and can be any method. Examples of the method include a method for feeding the transparent resin film between a rotating engraving roll and a rotating rubber roll such that the hairline groove forming surface faces the engraving roll and engraving hairline grooves while pressing the transparent resin film. Instead of the engraving roll, an engravable circulating belt such as a sandpaper belt, a steel wool belt, or a nonwoven fabric belt to which abrasive grains are attached may be used.

A hairline design (physical characteristics of the plurality of hairline grooves) is not particularly limited, and any known design may be used, but preferable forms are as follows.

According to at least one embodiment, the cross-sectional shape (that is, the cross-sectional shape of an engraving projection) of each of the hairline grooves is not particularly limited, but may be substantially semicircular typically. Examples of other cross-sectional shapes include a substantially semi-elliptical shape and a substantially rectangular shape. In addition, the width (width on a surface of the transparent resin film) of each of the hairline grooves is usually substantially constant in a case where a certain hairline groove is focused on.

According to at least one embodiment, the depth of each of the hairline grooves (the depth of the deepest part from the surface of the transparent resin film) may be preferably 0.05 to 15 µm, and more preferably 0.07 to 10 µm from a viewpoint of imparting a hairline design of a texture closer to a hairline design formed on a surface of a metal article, and from a viewpoint of making operation possible by visually checking an icon displayed on a touch panel through the decorative sheet according to an embodiment. In another embodiment, the depth of each of the hairline grooves may be 0.05 to 10 μm or 0.07 to 15 μm.

A distance between the hairline grooves adjacent to each other (a distance between the grooves from an outer edge of one groove to an outer edge of the other adjacent groove) may be preferably 1 to 500 μm, and more preferably 10 to 400 μm from a viewpoint of imparting a hairline design of a texture closer to a hairline design formed on a surface of a metal article, and from a viewpoint of making operation possible by visually checking an icon displayed on a touch panel through the decorative sheet according to an embodiment. In another embodiment, the distance between the hairline grooves may be 1 to 400 μm or 10 to 500 μm.

In any square having a length of 1 mm in a vertical direction to the hairline grooves and a length of 1 mm in a parallel direction thereto, there are preferably one or more portions where the distance between the adjacent hairline grooves is 50 μm or more, there are more preferably one or more portions where the distance between the adjacent hairline grooves is 100 μm or more, and there are still more preferably one or more portions where the distance between the adjacent hairline grooves is 150 μm or more.

According to at least one embodiment, the width of each of the hairline grooves and the interval between the hairline grooves are not particularly limited. A plurality of kinds of hairline designs may be imparted to a surface of one transparent resin film. In this case, the width of each of the hairline grooves and/or the interval between the hairline grooves may include a plurality of kinds, and may be random. The width of each of the hairline grooves and the interval between the hairline grooves are typically random due to a method for forming hairline grooves.

(B) Layer of Ink Paint Film Containing High Brightness Pigment (B) The layer of an ink paint film containing a high brightness pigment is a layer formed using an ink obtained by appropriately mixing a high brightness pigment and another optional component with a vehicle.

Examples of the high brightness pigment include flakes (metal powder) such as aluminum, brass, iron, copper, silver, or gold; glass particles coated with silver or a metal oxide such as titanium oxide, indium oxide, zinc oxide, or tin oxide; pulverized products of a vapor-deposited foil; mica; and pearl powder. Among these compounds, aluminum flakes are preferable from a viewpoint of imparting a hairline design of a texture closer to a hairline design formed on a surface of a metal article, and from a viewpoint of making operation possible by visually checking an icon displayed on a touch panel through the decorative sheet according to an embodiment. These compounds can be used singly or in a mixture of two or more kinds thereof as the high brightness pigment.

According to at least one embodiment, the aluminum flakes preferably have a scaly particle shape from a viewpoint of imparting a hairline design of a texture closer to a hairline design formed on a surface of a metal article, and from a viewpoint of making operation possible by visually checking an icon displayed on a touch panel through the decorative sheet according to an embodiment. When a particle shape distribution of the aluminum flakes is measured by a laser diffraction/scattering method, an average particle diameter (particle diameter at which accumulation from a smaller particle is 50% by mass in a particle diameter distribution curve) may be usually 0.1 to 100 μm, and preferably about 1 to 30 μm. In a case where the aluminum flakes are scaly, the thickness (number average thickness) thereof may be usually 1 to 1000 nm, and preferably about 10 to 800 nm when the particle shapes thereof are observed with a microscope.

According to at least one embodiment, the content of the high brightness pigment in the ink may be usually 100 parts by mass or less, and preferably 80 parts by mass or less relative to 100 parts by mass of the vehicle, although depending on compatibility between the vehicle and the pigment, from a viewpoint of a design property, from a viewpoint of adhesion between the layer (A) and the layer (B), and from a viewpoint of making operation possible by visually checking an icon displayed on a touch panel through the decorative sheet according to an embodiment. Meanwhile, the content of the high brightness pigment may be usually 5 parts by mass or more, preferably 20 parts by mass or more, more preferably 40 parts by mass or more, and still more preferably 60 parts by mass or more from a viewpoint of imparting a hairline design of a texture closer to a hairline design formed on a surface of a metal article. In another embodiment, the content of the high brightness pigment in the ink may be 5 parts by mass or more and 100 parts by mass or less, 5 parts by mass or more and 80 parts by mass or less, 20 parts by mass or more and 100 parts by mass or less, 20 parts by mass or more and 80 parts by mass or less, 40 parts by mass or more and 100 parts by mass or less, 40 parts by mass or more and 80 parts by mass or less, 60 parts by mass or more and 100 parts by mass or less, or 60 parts by mass or more and 80 parts by mass or less relative to 100 parts by mass of the vehicle.

Examples of the vehicle include an acrylic resin, a polyester-based resin, a urethane-based resin, a urethane-modified acrylic resin, and a vinyl chloride-vinyl acetate copolymer. These compounds can be used singly or in a mixture of two or more kinds thereof as the vehicle.

In a case where the biaxially stretched polyethylene terephthalate-based resin film is used as the transparent resin film, an acrylic resin, a polyester-based resin, a urethane resin, and a urethane-modified acrylic resin are preferable as the vehicle from a viewpoint of adhesion strength.

In a case where the amorphous or low crystalline aromatic polyester-based resin film is used as the transparent resin film, as the vehicle, a mixture of a polyalkyl (meth)acrylate-based resin and a vinyl chloride-vinyl acetate copolymer is preferable from a viewpoint of adhesion strength.

According to at least one embodiment, the polyalkyl (meth)acrylate-based resin is preferably a polyalkyl methacrylate-based resin, and more preferably a polymethyl methacrylate-based resin (a resin including a structural unit derived from methyl methacrylate in an amount of 95% by mass or more, preferably 97% by mass or more, more preferably 99% by mass or more relative to 100% by mass of the total amount of the constituent units).

Preferable examples of the vinyl chloride-vinyl acetate copolymer include a copolymer including a structural unit derived from vinyl acetate in an amount of 5 to 25% by mass, preferably 10 to 20% by mass relative to 100% by mass of the total amount of the constituent units.

As a blending ratio between the polyalkyl (meth)acrylate-based resin and the vinyl chloride-vinyl acetate copolymer, the content of the polyalkyl (meth)acrylate-based resin is usually 5 to 40% by mass and preferably 10 to 30% by mass, and the content of the vinyl chloride-vinyl acetate copolymer is usually 95 to 60% by mass and preferably 90 to 70% by mass, relative to 100% by mass of the total amount of the polyalkyl (meth)acrylate-based resin and the vinyl chloride-vinyl acetate copolymer.

In a case where the aromatic polycarbonate-based resin film is used as the transparent resin film, a vinyl chloride-vinyl acetate copolymer, an acrylic resin, a polyester-based resin, and a urethane-based resin are preferable as the vehicle from a viewpoint of adhesion strength.

In a case where the acrylic resin film is used as the transparent resin film, a vinyl chloride-vinyl acetate copolymer, an acrylic resin, and a urethane-based resin are preferable as the vehicle from a viewpoint of adhesion strength.

Examples of other optional component(s) which can be added to the vehicle include a pigment other than a high brightness pigment, a solvent, a stabilizer, a plasticizer, a catalyst, and a curing agent. These compounds can be used singly or in a mixture of two or more kinds thereof as the other optional component.

Examples of the pigment other than a high brightness pigment include an inorganic pigment such as titanium oxide (white), carbon black, red iron oxide, or ultramarine (ultramarine blue); an organic pigment such as aniline black, quinacridone red, isoindolinone yellow, or phthalocyanine blue; and an extender pigment such as calcium carbonate, barium sulfate, silicon oxide, or aluminum oxide. These compounds can be used singly or in a mixture of two or more kinds thereof as the pigment other than a high brightness pigment.

Examples of the solvent include methanol, ethanol, 2-propanol, 1-methoxy-2-propanol, n-butyl acetate, toluene, methyl ethyl ketone, methyl isobutyl ketone, ethyl acetate, and acetone. These compounds can be used singly or in a mixture of two or more kinds thereof as the solvent.

The ink containing a high brightness pigment can be obtained by mixing and stirring these components.

(B) The layer of an ink paint film containing a high brightness pigment can be usually formed by applying the ink containing a high brightness pigment onto a surface of (A) the layer of a transparent resin film on a side of a surface (rear surface side) where hairline grooves are formed, and then drying the applied ink. Applying and drying are not particularly limited, and any known means can be used.

Examples of the known means include roll coating, gravure coating, reverse coating, roll brushing, dip coating, spray coating, spin coating, air knife coating, and die coating.

According to at least one embodiment, the thickness of (B) the layer of a paint film may be preferably 20 µm or less, more preferably 10 µm or less, and still more preferably 5 µm or less from a viewpoint of making operation possible by visually checking an icon displayed on a touch panel through the decorative sheet according to an embodiment at a portion other than a portion in contact with the hairline grooves. The thickness of (B) the layer of a paint film may be preferably 0.1 µm or more, and more preferably 1 µm or more from a viewpoint of a designing property at a portion other than a portion in contact with the hairline grooves. In another embodiment, the thickness of (B) the layer of a paint film may be 0.1 µm or more and 20 µm or less, 0.1 µm or more and 10 µm or less, 0.1 µm or more and 5 µm or less, 1 µm or more and 20 µm or less, 1 µm or more and 10 µm or less, or 1 µm or more and 5 µm or less at a portion other than a portion in contact with the hairline grooves.

(C) Protective Layer

According to at least one embodiment, the decorative sheet may preferably include sequentially, from a front surface side thereof, (A) the layer of a transparent resin film, (B) the layer of an ink paint film containing a high brightness pigment, and (C) a protective layer. By including the protective layer (C), it is possible to prevent the layer (B) from being scratched to impair a design property when the decorative sheet is used.

According to at least one embodiment, the protective layer (C) is not particularly limited as long as being able to protect the layer (B). Preferably, the protective layer (C) is not particularly limited as long as being able to protect the layer (B) and being translucent.

Here, "the protective layer (C) is translucent" means having transparency contributing to a phenomenon that when the decorative sheet including the protective layer (C) according to an embodiment is placed on the dirt comparison chart available from National Printing Bureau in an environment of an illuminance of 600 lux, and is illuminated from below the chart at an illuminance of 17000 lux, a figure having a size of 5 mm$^2$ on the chart can be visually discriminated, and having a concealing property contributing to a phenomenon that when the decorative sheet of the present invention is placed on a gray scale for assessing staining defined in JIS L0805:2005 in an environment of an illuminance of 500 lux, a color difference of a color chip number 4-5 cannot be visually discriminated. That is, even in a case where the protective layer (C) is included, if transparency and a concealing property desired for the decorative sheet according to an embodiment are held, the protective layer is judged to be translucent.

According to at least one embodiment, the total light transmittance (measured according to JIS K7361-1:1997 using a turbidimeter "NDH2000" (trade name) available from Nippon Denshoku Industries Co., Ltd.) of the protective layer (C) is not particularly limited as long as having the above translucency, but may be usually 1 to 50% (more than 1% and 50% or less, more than 1% and less than 50%, 1% or more and 50% or less, or 1% or more and less than 50%), typically 5 to 30%, preferably 8 to 25%, and more preferably 10 to 20%. In another embodiment, the total light transmittance of the protective layer (C) may be 1 to 30% (including or not including 1%), 1 to 25% (including or not including 1%), 1 to 20% (including or not including 1%), 5 to 50% (including or not including 50%), 5 to 25%, 5 to 20%, 8 to 50% (including or not including 50%), 8 to 30%, 8 to 20%, 10 to 50% (including or not including 50%), 10 to 30%, or 10 to 25%.

According to at least one embodiment, the protective layer (C) can be formed, for example, by laminating any type of translucent resin film on a surface of the layer (B) opposite to the layer (A) directly or via an adhesive or an anchor coat and an adhesive.

Examples of any translucent resin film as described above include a translucent resin film of a polyester-based resin such as an aromatic polyester or an aliphatic polyester; an acrylic resin; a polycarbonate-based resin; a polyolefin-based resin such as polyethylene, polypropylene, or polymethylpentene; a cellulose-based resin such as cellophane, triacetylcellulose, diacetylcellulose, or acetylcellulose butyrate; a styrene-based resin such as polystyrene, an acrylonitrile-butadiene-styrene copolymer resin (ABS resin), a styrene-ethylene-butadiene-styrene copolymer, a styrene-ethylene-propylene-styrene copolymer, or a styrene-ethylene-ethylene-propylene-styrene copolymer; a polyvinyl chloride-based resin; a polyvinylidene chloride-based resin; a fluorine-containing resin such as polyvinylidene fluoride; polyvinyl alcohol, ethylene vinyl alcohol, polyether ether ketone, nylon, polyamide, polyimide, polyurethane, polyetherimide, polysulfone, or polyethersulfone, and a translucent resin film of a resin composition obtained by blending a colorant such as titanium oxide with these resins as desired. These films include an unstretched film, a uniaxially stretched film, and a biaxially stretched film. These films also include a laminated film obtained by laminating two or more layers of one or more of the above-illustrated films. These films may be colored to a desired color as long as being translucent. As a lamination method or the like in a case where the translucent resin film is a laminated film, a similar method to the above description for the layer (A) can be used.

Examples of the adhesive include a known adhesive such as a polyester-based adhesive, a polyurethane-based adhesive, a polyvinyl chloride-based adhesive, a polyvinyl acetate-based adhesive, an ethylene-vinyl acetate copolymer-based adhesive, an epoxy-based adhesive, a polychloroprene-based adhesive, a polyacrylic adhesive, a polymethacrylic adhesive, a polystyrene-based adhesive, a polyamide-based adhesive, a cellulose-based adhesive, a styrene-butadiene copolymer-based adhesive, or a mixture thereof.

As the protective layer (C), a paint film of any thermoplastic resin coat forming paint may be formed on a surface of the layer (B) opposite to the layer (A) directly or via an anchor coat.

Examples of the thermoplastic resin coat forming paint include a paint prepared by dissolving a thermoplastic resin in an organic solvent. By applying and drying the thermoplastic resin coat forming paint, a thermoplastic resin coat can be formed.

Examples of the thermoplastic resin used for the thermoplastic resin coat include a urethane-based resin, a polyester-based resin, an acrylic resin, a vinyl acetate-based resin, a vinyl chloride-based resin, a silicone-based resin, and a fluorine-based resin. Among these compounds, a urethane-based resin, a polyester-based resin, and an acrylic resin are preferable. These compounds can be used singly or in a mixture of two or more kinds thereof as the thermoplastic resin.

Examples of the organic solvent include 1-methoxy-2-propanol, ethyl acetate, n-butyl acetate, toluene, methyl ethyl ketone, methyl isobutyl ketone, diacetone alcohol, and acetone. These compounds can be used singly or in a mixture of two or more kinds thereof as the organic solvent.

According to at least one embodiment, the thermoplastic resin coat forming paint may contain one or more additives such as an antistatic agent, a surfactant, a leveling agent, a thixotropy-imparting agent, an anti-fouling agent (or a stain-proofing agent), a printability improver, an antioxidant, a weather resistance stabilizer, a light resistance stabilizer, an ultraviolet absorber, a heat stabilizer, a colorant, and a filler as desired.

According to at least one embodiment, the thermoplastic resin coat forming paint can be obtained by mixing and stirring these components.

A method for forming the thermoplastic resin coat on a surface of the layer (B) opposite to the layer (A) using the thermoplastic resin coat forming paint directly or via a transparent anchor coat is not particularly limited, but a known web coating method can be used. Examples of the method include roll coating, gravure coating, reverse coating, roll brushing, spray coating, air knife coating, and die coating.

As an anchor coating agent for forming the anchor coat, a known agent such as a polyester, an acrylate, a polyurethane, an acrylic urethane, or a polyester urethane can be used, for example. A method for forming the anchor coat using the anchor coating agent is not particularly limited, and a known web coating method can be used. Examples of the method include roll coating, gravure coating, reverse coating, roll brushing, spray coating, air knife coating, and die coating. The thickness of the anchor coat is usually about 0.1 to 5 µm, preferably 0.5 to 2 µm.

According to at least one embodiment, the thickness of the protective layer (C) is not particularly limited. In a case where the protective layer (C) is the thermoplastic resin coat, the thickness of the protective layer (C) may be preferably 0.5 µm or more, and more preferably 5 µm or more from viewpoints of external scratch resistance and solvent resistance. Meanwhile, in a case where the protective layer (C) is the thermoplastic resin coat, the thickness of the protective layer (C) may be preferably 100 µm or less, and more preferably 50 µm or less from a viewpoint of a handling property of a web. In another embodiment, in a case where the protective layer (C) is the thermoplastic resin coat, the thickness of the protective layer (C) may be 0.5 µm or more and 100 µm or less, 0.5 µm or more and 50 µm or less, 5 µm or more and 100 µm or less, or 5 µm or more and 50 µm or less.

In a case where the protective layer (C) is any translucent resin film as described above, the thickness of the protective layer (C) may be usually 20 µm or more, preferably 35 µm or more, and more preferably 50 µm or more from a viewpoint of a handling property. In a case where the protective layer (C) is any translucent resin film as described above, the thickness of the protective layer (C) may be usually 300 µm or less, preferably 150 µm or less, and more preferably 100 µm or less from a viewpoint of meeting a demand for thickness reduction of an article. In another embodiment, in a case where the protective layer (C) is any translucent resin film as described above, the thickness of the protective layer (C) may be 20 µm or more and 300 µm or less, 20 µm or more and 150 µm or less, 20 µm or more and 100 µm or less, 35 µm or more and 300 µm or less, 35 µm or more and 150 µm or less, 35 µm or more and 100 µm or less, 50 µm or more and 300 µm or less, 50 µm or more 150 µm or less, or 50 µm or more and 100 µm or less.

Physical Properties of Decorative Sheet

According to at least one embodiment, the decorative sheet has a surface resistivity of $1 \times 10^5 \Omega$ or more on a rear surface side thereof. By the surface resistivity of $1 \times 10^5 \Omega$ or more, preferably $1 \times 10^8 \Omega$ or more, the decorative sheet according to an embodiment can have a hairline design and does not impair operability of a touch panel. In a case where any layer (for example, the layer (C) or the like) is formed on a surface of the layer (B) on the opposite side (rear surface side) to the layer (A), the surface resistivity only needs to be measured for a surface on a side of any layer described above.

Here, the surface resistivity was measured in conformity to 5.13 resistivity (5.13.2 laminated plate) of JIS K6911-1995 using a resistivity meter "Hiresta-UP MCP-HT450" (trade name) available from DIA Instruments Co., Ltd. and an electrode "MCP-JB03" (trade name) having an inner diameter of a surface annular electrode of 70 mm and an outer diameter of an inner circle of the surface electrode of 50 mm under conditions in which an applied voltage was 10 V and a numerical value was read 60 seconds after application.

When the decorative sheet according to an embodiment is placed on the dirt comparison chart available from National Printing Bureau in an environment of an illuminance of 600 lux, preferably an illuminance of 1200 lux such that a surface thereof on a side of (A) the layer of a transparent resin film is an observation surface, and is illuminated from below the chart at an illuminance of 17000 lux, the decorative sheet has such a light transmittance that a person having corrected visual acuity of 1.0 for the left and right eyes can visually (both eyes) discriminate a figure having a size of 5 mm², preferably having a size of 4 mm², more preferably having a size of 3 mm² on the chart at a position 30 cm apart from a surface of the decorative sheet in a vertical direction. Because of having the above light transmittance, the decorative sheet according to an embodiment makes operation possible by visually checking an icon displayed on a touch panel through the decorative sheet according to an embodiment. Here, "visual acuity of 1.0" refers to ability to recognize a direction of a cut with a width of 1.5 mm in a Landoit's ring with a diameter of 7.5 mm, located 5 m ahead.

When a gray scale for assessing staining defined in JIS L0805:2005 is placed on a black test table (brightness: 29, gloss: 2.5%) in an environment of an illuminance of 500 lux and the decorative sheet according to an embodiment is further placed thereon such that a front surface (a surface on a side of (A) the layer of a transparent resin film) thereof is an observation surface, the decorative sheet has such a concealing property that a person having corrected visual acuity of 1.0 for the left and right eyes cannot visually (both eyes) discriminate a color difference of a color chip number 4-5, preferably a color difference of a color chip number 4 at a position 30 cm apart from a surface of the decorative sheet in a vertical direction. Because of having the above concealing property, when a touch panel is not operated (for example, when illumination of a screen display of the touch panel is off or in a low mode), the decorative sheet according to an embodiment can impart a hairline design of a texture closer to a hairline design formed on a surface of a metal article also to a portion incorporating the touch panel into an article.

Here, the illuminance was measured using a luminometer "testo 540" (trade name) manufactured by Test K.K.

2. Door Body of Refrigerator

An article to which a hairline design has been imparted using the decorative sheet according to an embodiment will be described with reference to FIGS. 1 and 2 exemplifying a door body for opening/closing a front part of a refrigerator main body. The door body illustrated in these drawings is merely a typical example and is not limited to this structure.

Figure 2:
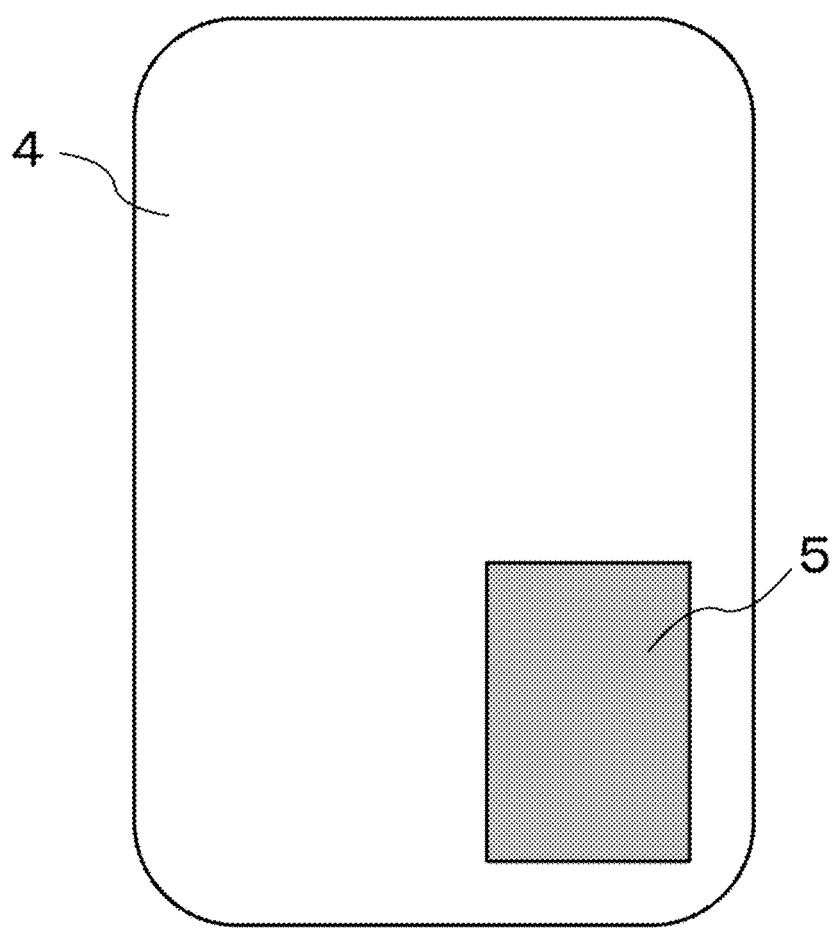
FIG. 2 is a conceptual view of a front illustrating an example of the door body using the decorative sheet according to an embodiment.

FIG. 1 is a partial conceptual view of a cross section illustrating an example of a door body using the decorative sheet according to an embodiment. FIG. 2 is a conceptual view of a front illustrating an example of the door body using the decorative sheet according to an embodiment.

In FIG. 1, a reference numeral 1 represents (A) the layer of a transparent resin film, a reference numeral 2 represents (B) the layer of an ink paint film containing a high brightness pigment, a reference numeral 3 represents the protective layer (C), a reference numeral 4 represents a front panel, a reference numeral 5 represents a touch panel, and a reference numeral 6 represents a display faceplate of the touch panel. The decorative sheet according to an embodiment is bonded onto a rear surface side of the front panel 4 of the door body (usually, a highly transparent glass plate or a resin plate) using a pressure-sensitive adhesive or an adhesive such that a front surface (surface on a side of (A) the layer of a transparent resin film 1) of the decorative sheet is a bonding surface.

The door body incorporates the touch panel 5. In this portion, the display faceplate 6 of the touch panel and a surface of the decorative sheet according to an embodiment on a side of the protective layer (C) 3 are bonded to each other using a pressure-sensitive adhesive or an adhesive. Typically, the door body is formed from the front panel 4, a frame body (not illustrated), and a rear panel (not illustrated), and an inside thereof is usually filled with a heat insulating material. Typically, a known foaming material can be used as the heat insulating material.

EXAMPLES

Hereinafter, the various embodiments will be described with reference to Examples, but the various embodiments are not limited thereto.

Methods for Measuring and Evaluating Various Physical Properties (i) Surface Resistivity The surface resistivity was measured in conformity to 5.13 resistivity (5.13.2 laminated plate) of JIS K6911-1995 using a resistivity meter "Hiresta-UP MCP-HT450" (trade name) available from DIA Instruments Co., Ltd. and an electrode "MCP-JB03" (trade name) having an inner diameter of a surface annular electrode of 70 mm and an outer diameter of an inner circle of the surface electrode of 50 mm under conditions in which an applied voltage was 10 V and a numerical value was read 60 seconds after application.

(ii) Light Transmittance

The light transmittance was evaluated by whether a person having corrected visual acuity of 1.0 for the left and right eyes could visually (both eyes) discriminate figures having sizes of 5 mm², 4 mm², and 3 mm² on the dirt comparison chart available from National Printing Bureau at a position 30 cm apart from a surface of a decorative sheet in a vertical direction when the decorative sheet was placed on the chart in an environment of an illuminance of 600 lux such that a front surface (surface on a side of (A) the layer of a transparent resin film) thereof was an observation surface, and was illuminated from below the chart at an illuminance of 17000 lux. Similarly, evaluation was performed under an environment of an illuminance of 1200 lux. In the table of results, a case where discrimination was possible was indicated by ○, and a case where discrimination was not possible was indicated by x. In the table, a result of the illuminance of 600 lux and a result of the illuminance of 1200 lux are illustrated in this order.

(iii) Concealing Property

It was evaluated whether a person having corrected visual acuity of 1.0 for the left and right eyes could visually (both eyes) discriminate each of a color chip number 4-5 and a color chip number 4 at a position 30 cm apart from a surface of a decorative sheet in a vertical direction when a gray scale for assessing staining defined in JIS L0805:2005 was placed on a black test table (brightness: 29, gloss: 2.5%) in an environment of an illuminance of 500 lux and the decorative sheet was further placed thereon such that a front surface (a surface on a side of (A) the layer of a transparent resin film) thereof was an observation surface. In the table of results, a case where discrimination was not possible was indicated by ○, and a case where discrimination was possible was indicated by x.

(iv) Specular Gloss (Initial)

According to JIS Z8741-1997, 20-degree specular gloss and 60-degree specular gloss were measured for a front surface (a surface on a side of (A) the layer of a transparent resin film) of a decorative sheet.

(v) Specular Gloss after Moisture and Heat Test

A decorative sheet was treated for 240 hours under an environment of a temperature of 60° C. and a relative humidity of 98%. Thereafter, in conformity to JIS Z8741-1997, 20-degree specular gloss and 60-degree specular gloss were measured for a front surface (a surface on a side of (A) the layer of a transparent resin film) of the decorative sheet. A specular glossiness retention (%) was calculated as a ratio of a resulting measured value after the moisture and heat test with respect to a measured value before the treatment.

(vi) Alkaline Aqueous Solution Immersion Test 1

A test piece was taken from a decorative sheet in a size of 5 cm in a machine direction and 5 cm in a transverse direction. The test piece was immersed in a 0.5% by mass sodium hydroxide aqueous solution for 24 hours. Thereafter, an end portion of the test piece was visually observed and evaluated according to the following criteria.

◯: No change was observed in the layer (B).

Δ: A change in color tone of the layer (B) was observed at an end portion of the test piece. However, no change in the layer (B) was observed at a position 0.5 mm or more apart from the end portion inside the test piece.

x: A change in color tone of the layer (B) was observed at a position 0.5 mm or more apart from the end portion inside the test piece.

(vii) Alkaline Aqueous Solution Immersion Test 2

The test piece was immersed in a 0.5% by mass sodium hydroxide aqueous solution for 24 hours. Thereafter, according to JIS Z8741-1997, 20-degree specular gloss and 60-degree specular gloss were measured. A specular glossiness retention (%) was calculated as a ratio of a resulting measured value after immersion with respect to a measured value before the treatment.

(viii) Acidic Aqueous Solution Immersion Test 1

A test piece was taken from a decorative sheet in a size of 5 cm in a machine direction and 5 cm in a transverse direction. The test piece was immersed in a 5% by mass sulfuric acid aqueous solution for 24 hours. Thereafter, an end portion of the test piece was visually observed and evaluated according to the following criteria.

◯: No change was observed in the layer (B).

Δ: A change in color tone of the layer (B) was observed at an end portion of the test piece. However, no change in the layer (B) was observed at a position 0.5 mm or more apart from the end portion inside the test piece.

x: A change in color tone of the layer (B) was observed at a position 0.5 mm or more apart from the end portion inside the test piece.

(ix) Acidic Aqueous Solution Immersion Test 2

The test piece was immersed in a 5% by mass sulfuric acid aqueous solution for 24 hours. Thereafter, according to JIS Z8741-1997, 20-degree specular gloss and 60-degree specular gloss were measured. A specular glossiness retention (%) was calculated as a ratio of a resulting measured value after immersion with respect to a measured value before the treatment.

(x) Design Property

In a dark place, light of a 40 W white fluorescent lamp (300 lux) was vertically incident on a front surface (a surface on a side of the layer (A)) of a decorative sheet from a position separated by a distance of 50 cm from the surface. The decorative sheet was visually observed from a position having an angle of 45° with respect to the surface and separated by a distance of 50 cm therefrom, and evaluated according to the following criteria.

◯: A design property is high. There is a texture close to a design formed on a surface of a metal article.

Δ: A design property is not high.

x: A design property is low. There is no texture like a design formed on a surface of a metal article.

Raw Materials Used (A) Transparent Resin Film (A-1) A biaxially stretched polyethylene terephthalate-based resin film (total light transmittance: 91%, haze: 1.0%) which has been subjected to an easy adhesion treatment on one surface and has a thickness of 50 μm (B) Ink Containing High Brightness Pigment (B-1) An ink containing 100 parts by mass of a vehicle (urethane-based resin), 75 parts by mass of aluminum flakes (scaly, average particle diameter: 9 μm, number average thickness: 600 nm), 2 parts by mass of a trifunctional isocyanate, 24 parts by mass of methyl ethyl ketone, and 3 parts by mass of isopropanol.

Here, the number average thickness of the aluminum flakes was determined by forming a paint film of the above (B-1) on a biaxially stretched polyethylene terephthalate-based resin film with a thickness of 50 μm, which had been subjected to an easy peeling treatment, using an applicator such that the paint film had a thickness of 2 μm after drying; and then observing a cross section of the paint film in an operation direction of the applicator with a microscope and taking the number average of thicknesses of 20 aluminum flakes.

(C) Protective Layer (C-1) A translucent polyvinyl chloride-based resin film (thickness: 80 μm, total light transmittance: 15%)

(C-2) A translucent polyvinyl chloride-based resin film (thickness: 80 μm, total light transmittance: 9%)

(C-3) A translucent polyvinyl chloride-based resin film (thickness: 80 μm, total light transmittance: 5%)

(C-4) A translucent polyvinyl chloride-based resin film (thickness: 80 μm, total light transmittance: 1%)

(C-5) A translucent polyvinyl chloride-based resin film (thickness: 80 μm, total light transmittance: 25%)

(C-6) A translucent polyvinyl chloride-based resin film (thickness: 80 μm, total light transmittance: 50%)

(D) Transparent Adhesive (D-1) A polyester-based adhesive "E-295" (trade name) available from Dainichiseika Color & Chemicals Mfg. Co., Ltd.

For this adhesive, total light transmittance was measured using a spectrophotometer "SolidSpec-3700" (trade name) available from Shimadzu Corporation and a quartz cell having an optical path length of 10 mm, and 92% was obtained.

Example 1

The (A-1) was scratch processed while being brought into contact with a polishing roll obtained by bonding #240 sandpaper to a metal roll without a gap such that an easy adhesion surface was a process surface, and hairline grooves were engraved. The hairline grooves engraved in the (A-1) were randomly observed at 100 positions using a microscope. As a result, the depth was 0.07 to 5 μm, and the distance between the grooves was 20 to 350 μm. Furthermore, in any square having a length of 1 mm in a vertical direction to the hairline grooves and a length of 1 mm in a parallel direction thereto, there were 5 to 9 portions (7 portions in number average) where the distance between the adjacent hairline grooves was 50 μm or more, there were 2 to 6 portions (4 portions in number average) where the distance between the adjacent hairline grooves was 100 μm or more, there were 1 to 3 portions (2 portions in number average) where the distance between the adjacent hairline grooves was 150 µm or more, and the maximum distance was 350 µm.

Next, a paint film formed of the (B-1) was formed on the hairline groove engraved surface (easy adhesion surface) of the (A-1) with a gravure roll type coating apparatus such that the thickness after drying (at a portion other than a portion in contact with the hairline) was 2 µm. Subsequently, an adhesive layer of the (D-1) was formed on the paint film formed of the (B-1) with a gravure roll type coating apparatus so as to have a thickness of 4 µm after drying, and the (C-1) was further bonded onto the adhesive layer to obtain a decorative sheet. The above tests (i) to (x) were performed. The results are shown in Table 1.

Examples 2 to 6

Production of a decorative sheet and measurement and evaluation of physical properties thereof were performed in a similar manner to Example 1 except that the layers illustrated in Table 1 were used in place of the (C-1) as the protective layer (C). The results are shown in Table 1.

Example 7

Production of a decorative sheet and measurement and evaluation of physical properties thereof were performed in a similar manner to Example 1 except that the thickness of the paint film formed of the (B-1) after drying (at a portion other than a portion in contact with the hairline) was changed to 5 µm. The results are shown in Table 1.

Example 8

Production of a decorative sheet and measurement and evaluation of physical properties thereof were performed in a similar manner to Example 1 except that the thickness of the paint film formed of the (B-1) after drying (at a portion other than a portion in contact with the hairline) was changed to 15 µm. The results are shown in Table 1.

INDUSTRIAL APPLICABILITY

The decorative sheet according to various embodiments has a hairline design of a texture like a hairline design formed on a surface of a metal article and makes operation possible by visually checking an icon displayed on a touch panel through the decorative sheet. Therefore, the decorative sheet according to an embodiment can be suitably used as a decorative sheet for imparting a hairline design to an article such as a refrigerator incorporating a touch panel in a part or the whole of a front panel of a door body for opening/closing a front part of a main body or a flat panel of a lid body for opening/closing a flat part of the main body, or the like.

REFERENCE SIGNS LIST

1: (A) Layer of transparent resin film
2: (B) Layer of ink paint film containing high brightness pigment
3: (C) Protective layer
4: Front panel
5: Touch panel
6: Display faceplate of touch panel

The invention claimed is:
1. A decorative sheet, comprising:
sequentially, from a front surface side thereof, (A) a layer of a transparent resin film and (B) a layer of an ink paint film containing a high brightness pigment,
wherein a plurality of linear hairline grooves are formed on a surface of the transparent resin film facing (B), the layer of an ink paint film containing at least one high brightness pigment selected from the group consisting of flakes of aluminum, brass, iron, copper, silver, or gold; glass particles coated with silver, titanium oxide, indium oxide, zinc oxide or tin oxide; pulverized products of a vapor-deposited foil; mica; and pearl powder,
wherein the decorative sheet has a surface resistivity of $1 \times 10^5 \Omega$ or more on a rear surface side thereof,
wherein, when the decorative sheet is placed on the dirt comparison chart available from the National Printing Bureau of Japan in an environment of an illuminance of

TABLE 1

|  |  | Example 1 | Example 2 | Example 3 | Example 4 | Example 5 | Example 6 | Example 7 | Example 8 |
|---|---|---|---|---|---|---|---|---|---|
| Config- | Layer A | A-1 | A-1 | A-1 | A-1 | A-1 | A-1 | A-1 | A-1 |
| uration | Layer B | B-1 | B-1 | B-1 | B-1 | B-1 | B-1 | B-1 | B-1 |
|  | Thickness of layer B (µm) | 2 | 2 | 2 | 2 | 2 | 2 | 5 | 15 |
|  | Layer C | C-1 | C-2 | C-3 | C-4 | C-5 | C-6 | C-1 | C-1 |
|  | Total light transmittance of layer C % | 15 | 9 | 5 | 1 | 25 | 50 | 15 | 15 |
| Evalua- | Surface resistivity Ω | $2.4 \times 10^7$ | $2.4 \times 10^7$ | $2.4 \times 10^7$ | $2.4 \times 10^7$ | $2.4 \times 10^7$ | $2.4 \times 10^7$ | $1.1 \times 10^6$ | $1.1 \times 10^5$ |
| tion | Light transmittance 5 mm^2 | o-o | o-o | o-x | x-x | o-o | o-o | o-o | o-o |
| Results | Light transmittance 4 mm^2 | o-o | o-x | x-x | x-x | o-o | o-o | o-o | x-x |
|  | Light transmittance 3 mm^2 | o-o | x-x | x-x | x-x | o-o | o-o | o-o | x-x |
|  | Concealing property, color chip number 4-5 | o | o | o | o | o | x | o | o |
|  | Concealing property, color chip number 4 | o | o | o | o | x | x | o | x |
|  | 20-Degree specular gloss % | 168 | 168 | 168 | 168 | 168 | 168 | 159 | 152 |
|  | Retention after moisture and heat test % | 96 | 96 | 96 | 96 | 96 | 96 | 89 | 82 |
|  | Retention after alkaline immersion % | 88 | 88 | 88 | 88 | 88 | 88 | 77 | 78 |
|  | Retention after acid immersion % | 90 | 90 | 90 | 90 | 90 | 90 | 80 | 79 |
|  | 60-Degree specular gloss % | 183 | 183 | 183 | 183 | 183 | 183 | 170 | 152 |
|  | Retention after moisture and heat test % | 98 | 98 | 98 | 98 | 98 | 98 | 90 | 82 |
|  | Retention after alkaline immersion % | 89 | 89 | 89 | 89 | 89 | 89 | 78 | 79 |
|  | Retention after acid immersion % | 90 | 90 | 90 | 90 | 90 | 90 | 82 | 78 |
|  | Alkaline immersion test 1 | o | o | o | o | o | o | o | o |
|  | Acid immersion test 1 | o | o | o | o | o | o | o | o |
|  | Design property | o | o | o | o | o | o | o | o |

600 lux, and is illuminated from below the chart at an illuminance of 17000 lux, a figure having a size of 5 mm$^2$ on the chart can be visually discriminated, wherein, when the decorative sheet is placed on a gray scale for assessing staining defined in JIS L 0805:2005 in an environment of an illuminance of 500 lux, a color difference of a color chip number 4-5 cannot be visually discriminated, and wherein (B) the layer of an ink paint film containing a high brightness pigment has a thickness of 0.1 to 20 μm in a portion other than a contact portion with respect to the hairline grooves.

2. The decorative sheet according to claim 1, comprising: sequentially, from a front surface side thereof, (A) the layer of the transparent resin film, (B) the layer of the ink paint film containing the high brightness pigment, and (C) a protective layer, wherein the protective layer (C) has total light transmittance of 5 to 30%.

3. The decorative sheet according to claim 1, wherein each of the hairline grooves has a depth of 0.05 to 15 μm, a distance between the hairline grooves adjacent to each other is 1 to 500 μm, and on a surface of the transparent resin film where the hairline grooves are formed, any square having a length of 1 mm in a direction perpendicular to the hairline grooves and a length of 1 mm in a parallel direction thereto has one or more portions where a distance between the hairline grooves adjacent to each other is 50 μm or more.

4. The decorative sheet according to claim 1, wherein the high brightness pigment is formed of aluminum flakes.

5. An article having the decorative sheet according to claim 1 laminated on a surface of a display with a touch panel function such that a rear surface side of the decorative sheet serves as the display side.

6. The article according to claim 5, further comprising: one of a glass plate or a transparent resin plate laminated on a surface of the article on a side of (A) the layer of the transparent resin film.

\* \* \* \* \*